United States Patent
Liu

(10) Patent No.: US 12,054,599 B1
(45) Date of Patent: Aug. 6, 2024

(54) FOAMED RUBBER SHOE MATERIAL AND METHOD FOR PREPARING THE SAME

(71) Applicant: GUANGZHOU KUNHAO SHOES CO., LTD., Guangdong (CN)

(72) Inventor: Zhonghua Liu, Guangdong (CN)

(73) Assignee: GUANGZHOU KUNHAO SHOES CO., LTD., Guangdong (CN)

( * ) Notice: Subject to any disclaimer, the term of this patent is extended or adjusted under 35 U.S.C. 154(b) by 0 days.

(21) Appl. No.: 18/420,002

(22) Filed: Jan. 23, 2024

Related U.S. Application Data

(63) Continuation of application No. PCT/CN2023/128351, filed on Oct. 31, 2023.

(30) Foreign Application Priority Data

Apr. 24, 2023 (CN) .......................... 202310448935.5

(51) Int. Cl.
| | |
|---|---|
| C08K 13/02 | (2006.01) |
| A43B 1/028 | (2022.01) |
| A43B 1/10 | (2006.01) |
| B32B 5/18 | (2006.01) |
| B32B 5/24 | (2006.01) |
| B32B 25/04 | (2006.01) |
| C08J 9/00 | (2006.01) |
| C08K 3/014 | (2018.01) |
| C08K 3/04 | (2006.01) |
| C08K 3/22 | (2006.01) |
| C08K 3/26 | (2006.01) |
| C08K 3/30 | (2006.01) |
| C08K 3/40 | (2006.01) |
| C08K 5/05 | (2006.01) |
| C08K 5/09 | (2006.01) |
| D06N 3/00 | (2006.01) |
| D06N 3/10 | (2006.01) |

(52) U.S. Cl.
CPC .............. *C08K 13/02* (2013.01); *A43B 1/028* (2022.01); *A43B 1/10* (2013.01); *B32B 5/18* (2013.01); *B32B 5/245* (2013.01); *B32B 25/042* (2013.01); *B32B 25/045* (2013.01); *C08J 9/0023* (2013.01); *C08J 9/0066* (2013.01); *D06N 3/0043* (2013.01); *D06N 3/0063* (2013.01); *D06N 3/10* (2013.01); *B32B 2266/0207* (2013.01); *B32B 2266/08* (2013.01); *C08J 2307/00* (2013.01); *C08K 3/014* (2018.01); *C08K 3/04* (2013.01); *C08K 2003/2296* (2013.01); *C08K 2003/265* (2013.01); *C08K 3/30* (2013.01); *C08K 3/40* (2013.01); *C08K 5/05* (2013.01); *C08K 5/09* (2013.01); *D06N 2205/04* (2013.01); *D06N 2211/106* (2013.01)

(58) Field of Classification Search
CPC ... C08K 3/02; C08K 3/04; C08K 3/30; C08K 3/40; C08K 5/05; C08K 5/09; C08K 2003/2296; C08K 2003/265; A43B 1/028; A43B 1/10; B32B 5/18; B32B 5/245; B32B 25/042; B32B 25/045; C08J 9/0023; C08J 9/0066; C08J 2307/00; D06N 3/0043; D06N 3/0063; D06N 3/10; D06N 2205/04; D06N 2211/106
See application file for complete search history.

(56) References Cited

U.S. PATENT DOCUMENTS

2005/0118908 A1* 6/2005 Chen .................. B32B 3/30
442/59

FOREIGN PATENT DOCUMENTS

JP 2018080262 A * 5/2018

OTHER PUBLICATIONS

Translation of JP-2018080262-A, Keitaro Fujikura, May 24, 2018. (Year: 2018).*

* cited by examiner

*Primary Examiner* — Hai Vo
(74) *Attorney, Agent, or Firm* — Cooper Legal Group, LLC

(57) ABSTRACT

A foamed rubber shoe material is obtained from a rubber shoe base material by vulcanization, foaming, and cutting, the rubber shoe base material includes a rubber sheet and a cloth attached on the rubber sheet, the rubber sheet is prepared from a premixed rubber material in an open mill, the premixed rubber material includes the following components in parts by weight: 44-48 parts of rubber matrix, 24-28 parts of a filler, 5-7 parts of an oil material, 4-5 parts of a vulcanization agent, 1.8-2.2 parts of an antiager, 0.5-0.7 parts of an accelerator, 4-6 parts of triterpenoid saponin, 8-12 parts of n-butanol, 3-5 parts of an unsaturated fatty acid, 7-9 parts of sulfur, 1.6-2.4 parts of dicumyl peroxide, and 10-14 parts of a foaming agent, the foaming agent includes a combination of 4,4'-oxybis(benzenesulfonyl hydrazide), petroleum ether, dichloroethane and at least one bicarbonate, and the rubber matrix includes a natural rubber.

9 Claims, No Drawings

FOAMED RUBBER SHOE MATERIAL AND METHOD FOR PREPARING THE SAME

CROSS-REFERENCE TO RELATED APPLICATION

This application is a continuation of PCT application serial no. PCT/CN2023/128351, filed on Oct. 31, 2023, which claims the priority and benefit of Chinese patent application serial no. 202310448935.5, filed on Apr. 24, 2023. The entireties of PCT application serial no. PCT/CN2023/128351 and Chinese patent application serial no. 202310448935.5 are hereby incorporated by reference herein and made a part of this specification.

TECHNICAL FIELD

The present application relates to a technical field of foamed rubber shoe material, and in particular, to a foamed rubber shoe material and a method for preparing the same.

BACKGROUND ART

Foamed materials refer to materials with a certain amount of pores, and are composed of a continuously distributed solid phase and a fluid phase, usually gas, distributed in the solid phase. Polymer foamed material is an important type in the foamed materials, and mainly includes plastic foamed materials and rubber foamed materials. The method for preparing the rubber foamed materials usually includes adding a foaming agent into the rubber matrix. During the vulcanization process of the rubber, the foaming agent undergoes physical and chemical changes to form gas, under the vulcanization crosslinking effects, the gas is trapped in the rubber materials, thereby forming the pores.

A foamed rubber shoe material is disclosed in the related technology, which is prepared by the vulcanization and foaming process of the rubber shoe base material, and the rubber shoe base material includes a rubber sheet and cloth attached on the surface of the rubber sheet. At present, in order to improve the foaming property of the rubber, a plurality of foaming agents are combined, such as the combination of the chemical foaming agents and the physics foaming agents with different decomposing temperatures, such that the different foaming agents can play an effective foaming role during the heating process, thereby improving the adequacy of foaming.

However, there are also defects in the related technologies, for example, when a chemical foaming agent with a low boiling point and a plurality of physical foaming agents are used as the foaming agents, a large amount of bubbles are generated in the foaming and vulcanization processes, and the released bubbles have softening action on the rubber materials. At the same time, the bubbles are easy to break through the bubble wall, causing the collapse of the bubble wall and the densification of the rubber materials, which is not beneficial for sufficient foaming of the rubber materials.

SUMMARY

When the technical solution of the related technology is implemented, the bubbles are easy to break through the bubble wall, causing the collapse of the bubbles, which is not beneficial for the sufficient foaming of the rubber materials. In order to avoid the above defects, the present application provides a foamed rubber shoe material and a method for preparing the same.

In a first aspect, the present application provides a foamed rubber shoe material, adopting the following technical solutions:

A foamed rubber shoe material, the foamed rubber shoe material is obtained from a rubber shoe base material by vulcanization, foaming, and cutting, the rubber shoe base material includes a rubber sheet and a cloth attached on the rubber sheet, the rubber sheet is prepared from a premixed rubber material in an open mill, the premixed rubber material includes the following components in parts by weight: 44-48 parts of rubber matrix, 24-28 parts of a filler, 5-7 parts of an oil material, 4-5 parts of a vulcanization agent, 1.8-2.2 parts of an antiager, 0.5-0.7 parts of an accelerator, 4-6 parts of triterpenoid saponin, 8-12 parts of n-butanol, 3-5 parts of an unsaturated fatty acid, 7-9 parts of sulfur, 1.6-2.4 parts of dicumyl peroxide, and 10-14 parts of a foaming agent, the foaming agent includes a combination of 4,4'-oxybis(benzenesulfonyl hydrazide), petroleum ether, dichloroethane and at least one bicarbonate, and the rubber matrix includes a natural rubber.

By adopting the above technical solution, compared with the related technology, the triterpenoid saponin, n-butanol, unsaturated fatty acid and dicumyl peroxide are added into the rubber materials in the present application. In particular, the main structure of saponin in triterpenoid saponin is similar to the structure of natural rubber, so the binding force between the triterpenoid saponin and the natural rubber is good. The triterpenoid saponin is dissolved in the n-butanol, improving the migration performance of the triterpenoid saponin in the rubber material, and the n-butanol itself can be foamed by vaporization, playing a role of foaming agent. The triterpenoid saponin and unsaturated fatty acid are migrated to the interface between the bubble wall and the continuous phase of the rubber, the hydrophobic ends are distributed into the continuous phase of the rubber, and the hydrophilic ends form hydrogen bonds at the inner side of the bubble wall. Meanwhile, during the foaming and vulcanization process, the triterpenoid saponins can copolymerize with the unsaturated fatty acid and the natural rubber on the outer side of the bubble wall under the action of dicumyl peroxide. A synergistic effect of the copolymerization on the outer side of the bubble wall and the hydrogen bond on the inner side of the bubble is generated, significantly improving the strength of the bubble wall, which is beneficial to reducing the possibility of bubbles breaking through the bubble wall and collapse of the bubble wall. The defect of the rubber material being prone for densification is avoided, which is beneficial for the sufficient foaming of the rubber material. Due to the improvement of the foaming effect, the breathable pores on the shoe material can have better permeability, such that better breathability and sweat wicking effects of the shoe material can be achieved.

In some embodiments, a molecule of the unsaturated fatty acid contains 2-4 of carbon-carbon double bonds By adopting the above technical solution, the number of the carbon-carbon double bond in the molecules of unsaturated fatty acid preferably is 2-4. The unsaturated fatty acid with a plurality of carbon-carbon double bonds have more copolymerization sites, compared to a monoenoic acid, which is beneficial to promoting the copolymerization in the foaming and vulcanization process, thereby reducing the possibility of bubbles breaking through the bubble wall, and promoting the sufficient foaming of the rubber materials.

In some embodiments, the unsaturated fatty acid is a farnesic acid.

By adopting the above technical solution, alkyl group of the farnesic acid is mainly composed of isoprene units, and has good compatibility with the triterpenoid saponin and the natural rubber, which helps to improve the strength of the bubble wall and promote the sufficient foaming of the rubber material.

In some embodiments, the rubber matrix further includes a prevulcanized rubber, a weight ratio of the natural rubber and the prevulcanized rubber is 10:(1-2), and the prevulcanized rubber is prepared as follows:

Step (1) mixing zinc oxide, stearic acid, an accelerator, an antiager, and sulfur with a butadiene styrene rubber to obtain a butadiene styrene rubber mixture;

Step (2) performing vulcanization on a first portion of the butadiene styrene rubber mixture under selected vulcanization parameters, and testing a theoretical positive vulcanization period of the butadiene styrene rubber mixture under a condition of the selected vulcanization parameters; and Step (3) performing a vulcanization process on a second portion of the butadiene styrene rubber mixture under the selected vulcanization parameters, wherein a vulcanization period is set to be 20-70% of the theoretical positive vulcanization period determined in step (2), and obtaining a prevulcanized rubber after the vulcanization process.

By adopting the above technical solution, the butadiene styrene rubber is selected as raw material in the present application, on the basis of the tested theoretical positive vulcanization period, and the vulcanization period is defined to be 20-70% of theoretical positive vulcanization period, the prevulcanized rubber with a certain crosslinking degree is obtained. The prevulcanized rubber is not vulcanized completely, and still has activity and workability, which is capable of being further vulcanized in a suitable condition. During the process of preparing the premixed rubber materials, the natural rubber can also be vulcanized via the remaining sulfur in the prevulcanized rubber, and the prevulcanized rubber itself already has a certain crosslinking degree, so that the rubber matrix in the rubber materials has a certain crosslinking degree at the beginning of foaming and vulcanization, thereby improving the gas barrier of the rubber material, reducing the possibility of bubbles breaking through the bubble wall and the collapse of the bubble wall, which is beneficial for the sufficient foaming of the rubber material.

In some embodiments, in the Step (3), the vulcanization period is set to be 28-52% of theoretical positive vulcanization period determined in step (2).

By adopting the above technical solution, as the increasing vulcanization period of the prevulcanized rubber prolongs, the crosslinking degree of the prevulcanized rubber is also increased. The vulcanization period is closely related to the crosslinking degree. The prevulcanized rubber of the present application needs to have appropriate crosslinking degree, so an effective gas barrier effect can be obtained, which can avoid the defect that the bubbles prone to be broken during the vulcanization process. Meanwhile, the crosslinking degree should not be too high, because the prevulcanized rubber with excessive crosslinking degree is not easily dispersed evenly in the natural rubber. Therefore, the vulcanization period is set to be 28-52% of the theoretical positive vulcanization period.

In some embodiments, the filler includes a a modified fiberglass, and the modified fiberglass is a fiberglass grafted with amino groups on a surface of the fiberglass.

By adopting the above technical solution, the modified fiberglass is added into the rubber material in the present application. The amino groups on the surface of the modified fiberglass are able to promote the vulcanization of the rubber, which helps overcome the delayed effect of 4,4'-oxybis(benzenesulfonyl hydrazide) on the rubber vulcanization, and is capable of improving the match degree between the vulcanication process and the foaming process, reducing the possibility of bubbles breaking through the bubble wall and the collapse of the bubble wall, which is beneficial for the sufficient foaming of the rubber material.

In some embodiments, a method for preparing the modified fiberglass is as follows:

prepared as follows:

Step (1) adding a silane coupling agent into water to obtain a modified silane solution; degreasing the fiberglass by heating, wherein the silane coupling agent includes γ-aminopropyltriethoxysilane, and a mass fraction of the γ-aminopropyltriethoxysilane in the modified silane solution is 2.5-4.5%; and Step (2) adding the fiberglass into the modified silane solution, stirring under nitrogen protection, heating to 70-75° C., keeping a temperature of 70-75° C. for 2-3 h, filtering to recover the fiberglass, washing and drying the fiberglass, to obtain the modified fiberglass.

By adopting the above technical solution, the treatment of the γ-aminopropyltriethoxysilane is used in the present application, due to the coupling between the silane coupling agent and the fiberglass, the amino groups are grafted on the surface of the fiberglass, and the modified fiberglass is obtained.

In some embodiments, the silane coupling agent further includes a vinyl triethoxysilane, and a mass fraction of the vinyl triethoxysilane in the modified silane solution is 3.8-5.4%.

By adopting the above technical solution, vinyl groups are introduced on the surface of the modified fiberglass by the vinyl triethoxysilane. The vinyl groups introduced in this way can copolymerize with the unsaturated bonds in the rubber matrix under the action of dicumyl peroxide, achieving the binding of the filler and the rubber matrix, which helps to restrict the softening action of bubbles on the rubber materials and to improve the foaming effect of the rubber materials in a proper range of usage amount. Due to improvement of the foaming effect, breathable pores on the shoe material are more breathable, so as to achieve the effects of more breathability and sweat wicking of the shoe material.

In some embodiments, a usage amount of the modified fiberglass is 0.8-1.2% of a weight of the rubber matrix.

By adopting the above technical solution, the usage amount of the modified fiberglass is preferred, which is beneficial to restricting the softening action of bubbles on the rubber materials and improving the foaming effect of the rubber material.

In a second aspect, the present application provides a method for preparing the foamed rubber shoe material, adopting the following technical solution:

a method for preparing the foamed rubber shoe material, includes the following steps:

Step (1) adding a rubber matrix, a filler, an oil material, an antiager, a vulcanization agent, n-butanol, triterpenoid saponin, an unsaturated fatty acid into an internal mixer, mixing and discharging, to obtain a master batch; mixing 4,4'-oxybis(benzenesulfonyl hydrazide), petroleum ether, dichloroethane and a bicarbonates, then stirring and homogenizing to obtain a foaming agent for later use;

Step (2) mixing the master batch, an accelerator, sulfur, dicumyl peroxide and the foaming agent to obtain a premixed rubber material, milling the premixed rubber materials in an open mill, and obtaining a rubber sheet; and Step (3) attaching cloth on a surface of the rubber sheet, to obtain a rubber shoe base material, and transferring the rubber shoe base material to a vulcanization device for foaming and vulcanization, then cutting, to obtain a foamed rubber shoe material.

By adopting the above technical solution, in the preparation method of the present application, firstly, the master batch and the foaming agent are prepared respectively, and then the master batch and the foaming agent are mixed to obtain the premixed rubber material. After being milled, the rubber sheet is obtained. Then, the cloth is attached on the surface of the rubber sheet, and the foaming and vulcanization processes are performed, the foamed rubber shoe material is obtained. In the preparation method of the present application, hydrogen bonds are formed on the inter wall of the bubbles between the triterpenoid saponin and the hydrophilic groups of the unsaturated fatty acid, and copolymerization with the rubber matrix is generated on the outer side wall of the bubble, thus reducing the possibility of bubbles breaking through the bubble wall and the collapse of the bubble wall, and avoiding the defect of the rubber material being prone for densification, which is beneficial for the sufficient foaming of the rubber material.

In summary, the present application can achieve at least one of the following beneficial technical effects:

1. in the present application, the rubber materials are foamed and vulcanized, meanwhile, the copolymerization on the outer side of bubble wall and hydrogen bonds on the inner side of bubble wall together improve the strength of the bubble wall, reducing the possibility of bubbles breaking through the bubble wall to cause the collapse of bubble wall, and avoiding the defect of the rubber materials being prone for densification, which is beneficial for the sufficient foaming of the rubber material;
2. the unsaturated fatty acid is preferred a farnesic acid in the present application, the alkyl group of the farnesic acid is mainly composed of isoprene units, and has a good compatibility with the triterpenoid saponin and the natural rubber. The farnesic acid is capable of improving the copolymerization effect of the unsaturated fatty acid, the triterpenoid saponin and the rubber matrix, which is beneficial to improve the strength of the bubble wall and promote sufficient foaming of the rubber material; and
3. in the method of the present application, firstly, the master batch and foaming agent are respectively prepared, then the master batch and the foaming agent are mixed to obtain the premixed rubber material, and the premixed rubber material is milled to obtain the rubber sheet. Then the cloth is attached on the surface of the rubber sheet, the foaming and vulcanization processes are performed, the foaming rubber shoe material is prepared.

DETAILED DESCRIPTION

The present application is further described in detail below in combination with Examples, Preparation examples and Comparative examples, and the raw materials involved in the present application are all commercially available.

The preparation examples of the prevulcanized rubber:
Preparation example 1 was described in detail below.

Preparation Example 1

In this preparation example, the prevulcanized rubber was prepared by the following methods:

Step (1) 100 kg of styrene butadiene rubber and additives were mixed to obtain the styrene butadiene rubber mixture. In particular, the additives include 5 kg of zinc oxide, 5 kg of stearic acid, 1.2 kg of accelerator, 1 kg of antiager and 2 kg of sulfur;

Step (2) 5% of the total weight of the styrene butadiene rubber mixture were taken out, and vulcanized under a temperature of 150° C., and a theoretical positive vulcanization period of the butadiene styrene rubber mixture was tested;

Step (3), the remaining butadiene styrene rubber mixture was vulcanizied according to the vulcanization parameters in Step (2), the vulcanization period is set to be 20% of the theoretical positive vulcanization period, and a prevulcanized rubber was obtained after the vulcanization process.

Referring to table 1, The preparation examples 1-5 were same, except that the percentage of the vulcanization period of the butadiene styrene rubber mixture to the theoretical positive vulcanization period (hereinafter referred to as the proportion of vulcanization period) was different.

TABLE 1

| proportion of vulcanization period | |
|---|---|
| Samples | Proportion of vulcanization period/% |
| Preparation example 1 | 20 |
| Preparation example 2 | 28 |
| Preparation example 3 | 36 |
| Preparation example 4 | 52 |
| Preparation example 5 | 70 |

EXAMPLES

Examples 1-5

Example 1 was described in detail as follows.

Example 1

A foamed rubber shoe material was provided in this example, the foamed rubber shoe material was prepared by vulcanization and foaming processes of a rubber shoe base material and cutting, the rubber shoe base material includes a rubber sheet and a cloth attached on the rubber sheet, the rubber sheet was prepared by a premixed rubber material in an open mill; the premixed rubber materials include the following components in parts by weight: 44 kg of natural rubber, 24 kg of filler, 5 kg of oil material, 4 kg of vulcanization agent, 1.8 kg of antiager, 0.5 kg of accelerator, 4 kg of triterpenoid saponin, 8 kg of n-butanol, 3 kg of unsaturated fatty acid, 7 kg of sulfur, 1.6 kg of dicumyl peroxide, and 10 kg of foaming agent.

The rubber matrix was a natural rubber (No. 3 standard rubber from Vietnam), the filler was a combination of heavy calcium carbonate of 800 mesh and white carbon black of 300 mesh in a weight ratio of 14:9, the oil material was a white mineral oil of 10 #, the vulcanization agent was a combination of petroleum resin, polyethylene glycol-4000, paraffin and zinc oxide in a weight ratio of 0.8:1.4:0.25:1.9, the antiager was a combination of antiager SP-C and antiager SP-P in a weight ratio of 1:1, accelerator was a combination of accelerator D and accelerator TS in a weight ratio of 3:8, the unsaturated fatty acids was an oleic acid, and the foaming agent was a combination of ammonium bicarbonate, sodium bicarbonate, 4,4'-oxobenzenesulfonyl hydrazine, dichloroethane and petroleum ether in a weight ratio of 1:2:3:1:4.

A method for preparing the foamed rubber shoe material was provided in this example, including the following steps:

Step (1) the rubber matrix, filler, oil material, antiager, vulcanization agent, n-butanol, triterpenoid saponin, unsaturated fatty acid were added into an internal mixer for mixing, the rotary velocity was set as 60 r/min, the piston was pressed for 45 s, lifted for 10 s, pressed for 15 s, lifted for 15 s, and pressed until the rubber material was kept at 165° C., then discharging was performed, to obtain a master batch. The 4,4'-oxobenzenesulfonyl hydrazine, the petroleum ether, the dichloroethane and the bicarbonate were added into a stirred tank, and homogenized for 10 min at 2500 r/min of velocity, and obtaining a foaming agent, for later use;

Step (2) the master batch, the accelerator, the sulfur, the dicumyl peroxid and the foaming agent were mixed to obtain the premixed rubber materials, and the cooling water of 5° C. was passed into the roller of the open mill, and then the premixed compound was milled in the open mill, and the rubber sheet was obtained according to the roll distance of 2 mm.

Step (3) the surface of the rubber sheet was attached with the N-cloth, and the rubber shoe base material was obtained by pressing with a 2 mm roll distance by the tablet producing machine. The rubber shoe base material was transferred to the vulcanization tank for foaming and vulcanization. After the rubber shoe base material enters the vulcanization tank, the temperature was raised to 60 °C, then was kept for 20 min, the temperature was raised to 90° C., then was kept for 20 min, the temperature was raised to 115° C., then was kept for 45 min, and finally the temperature was raised to 150° ° C., the foam vulcanization was completed after 10 min and the mold is removed, and the rubber shoe base material was cut after the mold is removed to obtain the foam rubber shoe material.

Referring to FIG. 2, Examples 1-5 were same, except that the contents of raw materials in the premixed rubber materials were different.

TABLE 2 the contents of raw materials in the premixed rubber materials

| Samples | Example 1 | Example 2 | Example 3 | Example 4 | Example 5 |
|---|---|---|---|---|---|
| Rubber matrix (kg) | 44 | 45 | 46 | 47 | 48 |
| Filler (kg) | 24 | 25 | 26 | 27 | 28 |
| Oil material (kg) | 5 | 5.5 | 6 | 6.5 | 7 |
| Vulcanization agent (kg) | 4 | 4.2 | 4.5 | 4.8 | 5 |
| Antiager (kg) | 1.8 | 1.9 | 2.0 | 2.1 | 2.2 |
| Accelerator(kg) | 0.5 | 0.55 | 0.6 | 0.65 | 0.7 |
| Triterpenoid saponin (kg) | 4 | 4.5 | 5 | 5.5 | 6 |
| N-butanol (kg) | 8 | 9 | 10 | 11 | 12 |
| Unsaturated fatty acid (kg) | 3 | 3.5 | 4 | 4.5 | 5 |

TABLE 2-continued the contents of raw materials in the premixed rubber materials

| Samples | Example 1 | Example 2 | Example 3 | Example 4 | Example 5 |
|---|---|---|---|---|---|
| Sulfur (kg) | 7 | 7.5 | 8 | 8.5 | 9 |
| Dicumyl peroxide (kg) | 1.6 | 1.8 | 2.0 | 2.2 | 2.4 |
| Foaming agent (kg) | 10 | 11 | 12 | 13 | 14 |

Example 6

This example was same as Example 5, except that unsaturated fatty acid was a linoleic acid.

Example 7

This example was same as Example 5, except that the unsaturated fatty acid was linoleic acid.

Example 8

This example was same as Example 5, except that the unsaturated fatty acid was arachidonic acid.

Example 9

This example was same as Example 5, except that the unsaturated fatty acid was farnesic acid.

Example 10

This example was same as Example 9, except that the rubber matrix was a combination of natural rubber and butadiene styrene rubber in a weight ratio of 10:1.

Example 11

This example was same as Example 10, except that the rubber matrix was a combination of natural rubber and prevulcanized rubber in a weight ratio of 10:1, the prevulcanized rubber was prepared according to the method of preparation example 1.

Referring to table 3, Examples 11-15 were same, except that the preparation examples of the prevulcanized rubber was different.

TABLE 3 preparation example of the prevulcanized rubber

| Samples | Example 11 | Example 12 | Example 13 | Example 14 | Example 15 |
|---|---|---|---|---|---|
| Preparation example | Preparation example 1 | Preparation example 2 | Preparation example 3 | Preparation example 4 | Preparation example 5 |

Example 16

This example was same as Example 13, except that the filler was composed of heavy calcium carbonate of 800 mesh, white carbon black of 300 mesh and modified fiberglass, the usage amount of the modified fiberglass was 0.4% of the weight of the rubber matrix, and the balance was a combination of heavy calcium carbonate and white carbon black in a weight ratio of 14:9, with a total weight of 28 kg.

The modified fiberglass was prepared by the following steps:

Step (1) the silane coupling agent was added into water to obtain the modified silane solution, for later use; the fiberglass was heated to 400° C. for degreasing, then the fiberglass to cooled 20° C., for later use; in this step, the silane coupling agent used includes γ-aminopropyltriethoxysilane, the mass fraction of the γ-aminopropyltriethoxysilane in the modified silane solution was 0.5%;

Step (2) the fiberglass was added into the modified silane solution, stirred under nitrogen protection, and heated to 70° C.; then the temperature was kept for 2 h, the fiberglass was filtered and taken out, and washed and dried, to obtain the modified fiberglass.

Referring to FIG. 4, Examples 16-20 were same, except that the mass fraction of the γ-aminopropyltriethoxysilane in the modified silane solution (hereinafter referred to as aminosilane content) was different.

TABLE 4

Aminosilane content

| Samples | Aminosilane content (%) |
|---|---|
| Example 16 | 0.5 |
| Example 17 | 1.5 |
| Example 18 | 2.5 |
| Example 19 | 3.3 |
| Example 20 | 4.5 |

Example 21

This example was same as example 20, except that the silane coupling agent in the modified silane solution further includes vinyl triethoxysilane, and the mass fraction of the vinyl triethoxysilane in the modified silane solution was 2.2%.

Referring to FIG. 5, Examples 21-25 were same, except that the mass fraction of the vinyl triethoxysilane in the modified silane solution (hereinafter referred to as vinyl silane content) was different.

TABLE 5 vinyl silane content

| Samples | Vinyl silane content (%) |
|---|---|
| Example 21 | 2.2 |
| Example 22 | 3.0 |
| Example 23 | 3.8 |
| Example 24 | 4.6 |
| Example 25 | 5.4 |

Examples 25-29

Referring to Table 6, Examples 25-29 were same, except that the percentage of the modified fiberglass accounting for the weight of the rubber matrix was different. In the examples 25-29, the total weight amount of the fillers remains unchanged, the usage amount of the heavy calcium carbonate and the white carbon black were reduced with the increasing the proportion of the modified fiberglass, and a weight ratio of the heavy calcium carbonate with the white carbon black was maintained at 14:9.

TABLE 6 proportion of the modified fiberglass

| Samples | Percentage of the modified fiberglass (%) |
|---|---|
| Example 25 | 0.4 |
| Example 26 | 0.6 |
| Example 27 | 0.8 |
| Example 28 | 1.0 |
| Example 29 | 1.2 |

COMPARATIVE EXAMPLE

Comparative Example 1

A foamed rubber shoe material was provided in this comparative example, the foamed rubber shoe material was prepared by vulcanization and foaming processes of a rubber shoe base material and cutting, the rubber shoe base material includes a rubber sheet and a cloth attached on the rubber sheet, the rubber sheet was prepared by a premixed rubber material in an open mill; the premixed rubber materials include the following components in parts by weight: 44 kg of rubber matrix, 24 kg of filler, 5 kg of oil material, 4 kg of vulcanization agent, 1.8 kg of antiager, 0.5 kg of accelerator, 7 kg of sulfur, 10 kg of foaming agent.

The rubber matrix was a natural rubber (No. 3 standard rubber from Vietnam), the filler was a combination of heavy calcium carbonate of 800 mesh and white carbon black of 300 mesh in a weight ratio of 14:9, the oil material was a white mineral oil of 10 #, the vulcanization agent was a combination of petroleum resin, polyethylene glycol-4000, paraffin and zinc oxide in a weight ratio of 0.8:1.4:0.25:1.9, the antiager was a combination of antiager SP-C and antiager SP-P in a weight ratio of 1:1, accelerator was a combination of accelerator D and accelerator TS in a weight ratio of 3:8, the foaming agent was a combination of ammonium bicarbonate, sodium bicarbonate, 4,4'-oxobenzenesulfonyl hydrazine, dichloroethane and petroleum ether in a weight ratio of 1:2:3:1:4.

This comparative example further provides a method for preparing the foamed rubber shoe material, including the following steps:

Step (1) the rubber matrix, filler, oil material, antiager, and vulcanization agent were added into an internal mixer for mixing, the rotary velocity was set as 60 r/min, the piston was pressed for 45 s, lifted for 10 s, pressed for 15 s, lifted for 15 s, and pressed until the rubber material was kept at 165 °C, then discharging was performed, to obtain a master batch. The 4,4'-oxobenzenesulfonyl hydrazine, the petroleum ether, the dichloroethane and the bicarbonate were added into a stirred tank, and homogenized for 10 min at 2500 r/min of velocity, and obtaining a foaming agent, for later use;

Step (2) the master batch, the accelerator, the sulfur, and the foaming agent were mixed to obtain the premixed rubber materials, and the cooling water of 5° C. was passed into the roller of the open mill, and then the premixed compound was milled in the open mill, and the rubber sheet was obtained according to the roll distance of 2 mm.

Step (3) the surface of the rubber sheet was attached with the N-cloth, and the rubber shoe base material was obtained by pressing with a 2 mm roll distance by the tablet producing machine. The rubber shoe base material was transferred to the vulcanization tank for foaming and vulcanization. After the rubber shoe base material enters the vulcanization tank, the temperature was raised to 60° C., then was kept for 20 min, the temperature was raised to 90° C., then was kept for 20 min, the temperature was raised to 115° C., then was kept for 45 min, and finally the temperature was raised to 150° C., the foam vulcanization was completed after 10 min and the mold is removed, and the rubber shoe base material was cut after the mold is removed to obtain the foam rubber shoe material.

Comparative Example 2

This comparative example was same as comparative example 1, except that the premixed rubber material further includes 8 kg of n-butanol, which was mixed with the master batch, the accelerator, the sulfur and the foaming agent during the preparation of the foamed rubber shoe material.

Comparative Example 3

This comparative example was same as comparative example 1, except that the components of the premixed rubber material did not contain the triterpenoid saponin.

Comparative Example 4

This comparative example was same as comparative example 1, except that the components of the premixed rubber material did not contain the unsaturated fatty acid.

Comparative Example 5

This comparative example was same as comparative example 1, except that the components of the premixed rubber material did not contain the dicumyl peroxide.

Comparative Example 6

This comparative example was same as comparative example 1, except that the components of the premixed rubber material did not contain the n-butanol.

Test Method of the Properties

Evaluation of the Foaming Effect

The samples was cut from the rubber shoe base materials after the foaming and vulcanization processes in examples and comparative examples.

Test method: referring to the standard GB/T 6343-2009 "Cellular plastics and rubbers-Determination of apparent density", the apparent density of the samples were tested, then ratio of the apparent density of each example sample and comparative example sample to the apparent density of comparative example 1 was calculated, respectively, and the ratio was counted as a relative density, the results were shown in table 7.

TABLE 7

| Sample | Relative density (%) | Sample | Relative density (%) |
|---|---|---|---|
| Example 1 | 81.2 | Example 19 | 59.8 |
| Example 2 | 79.6 | Example 20 | 59.3 |
| Example 3 | 76.5 | Example 21 | 57.5 |
| Example 4 | 74.7 | Example 22 | 56.8 |
| Example 5 | 73.5 | Example 23 | 56.2 |
| Example 6 | 72.8 | Example 24 | 55.4 |
| Example 7 | 71.3 | Example 25 | 54.9 |
| Example 8 | 70.5 | Example 26 | 51.5 |
| Example 9 | 70.1 | Example 27 | 48.7 |
| Example 10 | 70.0 | Example 28 | 47.9 |
| Example 11 | 68.4 | Example 29 | 46.2 |
| Example 12 | 65.2 | Comparative example 1 | 100.0 |
| Example 13 | 63.9 | Comparative example 2 | 99.7 |
| Example 14 | 66.3 | Comparative example 3 | 97.2 |
| Example 15 | 68.8 | Comparative example 4 | 96.5 |
| Example 16 | 62.6 | Comparative example 5 | 98.7 |
| Example 17 | 61.7 | Comparative example 6 | 94.2 |
| Example 18 | 60.2 | / | / |

Comparing the test results of Example 1 and Comparative example 1 and referring to Table 7, it can be seen that, the relative density determined in Example 1 was lower than that of Comparative example 1, indicating that a lower apparent density and a better foaming effect were achieved after the foamed rubber shoe material of the present application was foamed and vulcanized.

Comparing the test results of Comparative example 1, Comparative example 2 and referring to Table 7, it can be seen that, even if the n-butanol was added on the basis of the Comparative example 1, the tested relative density was not significantly decreased, indicating that the collapse of bubble wall in the comparative example 1 was serious. Even if the added n-butanol can vaporize during the processing, the formed bubbles were difficult to retain, resulting in poor foaming effect of the rubber material.

Comparing the test results of Example 1 and Comparative example 3 and referring to Table 7, it can be seen that the relative density determined in Example 1 was lower than that of Comparative example 3, indicating when there lacks triterpenoid saponins in the premixed rubber material, it is not possible to form hydrogen bonds on the inner side of the bubble wall through the glucose unit of triterpenoid saponins, nor can triterpenoid saponins participate in copolymerization to fully improve the strength of the bubble wall. Moreover, the binding force between bubbles and natural rubber was poor, making it difficult to fully limit the softening effect of bubbles on the rubber material, resulting in poor foaming effect of the rubber material.

Comparing the test results of Example 1, Comparative example 4 and referring to Table 7, it can be seen that the relative density determined in Example 1 was lower than that of Comparative example 4, indicating when there lacks unsaturated fatty acid in the premixed rubber material, the strength of bubble wall will not be sufficiently improved only by copolymerization between the triterpenoid saponin and the natural rubber. Further, it is difficult to prevent the collapse of bubbles, therefore, the foaming effect of the rubber material was poor and not enough pores can be formed.

Comparing the test results of Example 1 and Comparative example 5 and referring to Table 7, it can be seen that the relative density determined in Example 1 was lower than that of Comparative example 5, indicating when there lacks dicumyl peroxide in the premixed rubber material, the strength of the bubble wall cannot be improved by copolymerization between the unsaturated fatty acid and the triterpenoid saponin. Therefore, bubbles are prone to collapse, resulting in poor foaming effect of the rubber material and inability to form enough pores. Comparing the test results of Example 1 and Comparative example 6 and referring to Table 7, it can be seen that the relative density determined in Example 1 was lower than that of Comparative example 5, indicating when there lacks dicumyl peroxide, the dispersion effect of the triterpenoid saponin is relatively poor, affecting the foaming effect of the rubber material.

Comparing the test results of Example 1 and Comparative examples 1-6 and referring to Table 7, it can be seen that during the foaming and vulcanization of the rubber materials in the present application, the triterpenoid saponin and the unsaturated fatty acid are migrated to the interface between the bubble wall and the continuous phase of the rubber, the hydrophilic ends form hydrogen bonds at the inner side of the bubble wall. And sapogenins in the triterpenoid saponins can copolymerize with the unsaturated fatty acid and the natural rubber at the outer side of the bubble wall, thereby improving the strength of the bubble wall, and reducing the possibility of bubbles breaking through the bubble wall and the collapse of the bubble wall, avoiding the defect of the rubber material being prone for densification, which was beneficial for the sufficient foaming of the rubber material.

Comparing the test results of Examples 5-9 and referring to Table 7, it can be seen that unsaturated fatty acid with a plurality of carbon-carbon double bonds had more copolymerization sites, which can better improve the copolymerization effect of the unsaturated fatty acid, the triterpenoid saponin and the natural rubber, which was beneficial to improving the strength of bubble wall and sufficiently promoting foaming of the rubber material. When the number of carbon-carbon double bonds in unsaturated fatty acids is the same, the relative density measured in Example 9 is lower than that in Example 7, indicating that the compatibility between the farnesic acid used in Example 9, triterpenoid saponins, and natural rubber is good, which helps to improve the strength of the bubble wall and fully promote the foaming of the rubber material.

Comparing the test results of Examples 9-15 and referring to Table 7, it can be seen that, although the addition of prevulcanized rubber can generally improve the foaming performance of the rubber material, as the vulcanization period of prevulcanized rubber increases, the improvement effect of prevulcanized rubber on the foaming performance of the rubber material shows a trend of first increasing and then decreasing, indicating that when the vulcanization period of prevulcanized rubber is too long, the improvement effect of prevulcanized rubber on the foaming effect of the rubber material will be limited to a certain extent. When the vulcanization period of prevulcanized rubber is set between 28-52% of the theoretical positive vulcanization period, it helps to sufficiently improve the foaming effect of the rubber material.

Comparing the test results of Example 13, Examples 16-20 and referring to Table 7, it can be seen that, the relative densities determined in Examples 16-20 were lower, indicating the addition of modified glass fiber can improve the matching degree between vulcanization process and foaming process, reduce the possibility of bubbles breaking through the bubble wall and causing collapse of the bubble wall, which is conducive to the sufficient foaming of the rubber material. When the mass fraction of γ-aminopropyltriethoxysilane in silane modification solution is 2.5-4.5%, the foaming effect of the adhesive is better.

Comparing the test results of Example 20, Examples 21-25 and referring to Table 7, it can be seen that the relative densities of Examples 21-25 were lower than that of Example 20, indicating the vinyl triethoxysilane is beneficial to restricting the softening effect of the bubbles on the rubber materials, and the foaming effect of the rubber material can be improved. When the mass fraction of the vinyl triethoxysilane in the modified silane solution was 3.8-5.4%, foaming effect of the rubber materials is relatively better.

Comparing the test results of Examples 25-29 and referring to Table 7, it can be seen that when the usage amount of the modified fiberglass is 0.8-1.2% of the weight of the rubber matrix, and foaming effect of the rubber materials is relatively better.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A foamed rubber shoe material, wherein the foamed rubber shoe material is obtained from a rubber shoe base material by vulcanization, foaming, and cutting, the rubber shoe base material comprises a rubber sheet and a cloth attached on the rubber sheet, the rubber sheet is prepared from a premixed rubber material in an open mill, the premixed rubber material comprises the following components in parts by weight: 44-48 parts of a rubber matrix, 24-28 parts of a filler, 5-7 parts of an oil material, 4-5 parts of a vulcanization agent, 1.8-2.2 parts of an antiager, 0.5-0.7 parts of an accelerator, 4-6 parts of triterpenoid saponin, 8-12 parts of n-butanol, 3-5 parts of an unsaturated fatty acid, 7-9 parts of sulfur, 1.6-2.4 parts of dicumyl peroxide, and 10-14 parts of a foaming agent, the foaming agent comprises a combination of 4,4'-oxybis(benzenesulfonyl hydrazide), petroleum ether, dichloroethane and at least one bicarbonate, and the rubber matrix comprises a natural rubber, wherein the rubber sheet comprises a plurality of bubbles, wherein hydrogen bonds are formed on an inner wall of the plurality of bubbles between the triterpenoid saponin and hydrophilic groups of the unsaturated fatty acid, and copolymerization of the triterpenoid saponin with the unsaturated fatty acid and the natural rubber is generated on an outer side wall of each of the plurality of bubbles, wherein the rubber sheet has a relative density ranging from 46.2% to 81.2%.

2. The foamed rubber shoe material according to claim 1, wherein a molecule of the unsaturated fatty acid contains 2-4 carbon-carbon double bonds.

3. The foamed rubber shoe material according to claim 1, wherein the unsaturated fatty acid is a farnesic acid.

4. The foamed rubber shoe material according to claim 1, wherein the rubber matrix further comprises a prevulcanized rubber, a weight ratio of the natural rubber and the prevulcanized rubber is 10:1-10:2, and the prevulcanized rubber is prepared as follows:

Step (1) mixing zinc oxide, stearic acid, the accelerator, the antiager, and the sulfur with a butadiene styrene rubber to obtain a butadiene styrene rubber mixture;

Step (2) performing vulcanization on a first portion of the butadiene styrene rubber mixture under selected vulcanization parameters, and testing a theoretical positive vulcanization period of the butadiene styrene rubber mixture under a condition of the selected vulcanization parameters; and Step (3) performing a vulcanization process on a second portion of the butadiene styrene rubber mixture under the selected vulcanization parameters, wherein a vulcanization period is set to be 20-70% of the theoretical positive vulcanization period determined in the step (2), and obtaining the prevulcanized rubber after the vulcanization process.

5. The foamed rubber shoe material according to claim 4, wherein, in the step (3), the vulcanization period is set to be 28-52% of the theoretical positive vulcanization period determined in the step (2).

6. The foamed rubber shoe material according to claim 1, wherein the filler comprises a modified fiberglass, and the modified fiberglass is a fiberglass grafted with amino groups on a surface of the fiberglass.

7. The foamed rubber shoe material according to claim 6, wherein the modified fiberglass is prepared as follows:

Step (1) adding a silane coupling agent into water to obtain a modified silane solution; degreasing the fiberglass by heating, wherein the silane coupling agent comprises γ-aminopropyltriethoxysilane, and a mass fraction of the γ-aminopropyltriethoxysilane in the modified silane solution is 2.5-4.5%; and Step (2) adding the fiberglass into the modified silane solution, stirring under nitrogen protection, heating to 70-75° C., keeping a temperature of 70-75° C. for 2-3 h, filtering to recover the fiberglass, washing and drying the fiberglass, to obtain the modified fiberglass.

8. The foamed rubber shoe material according to claim 7, wherein the silane coupling agent further comprises a vinyl triethoxysilane, and a mass fraction of the vinyl triethoxysilane in the modified silane solution is 3.8-5.4%.

9. The foamed rubber shoe material according to claim 8, wherein the modified fiberglass is present in an amount of 0.8-1.2% by weight based on 100% by weight of the rubber matrix.

* * * * *